US008850332B2

(12) United States Patent  (10) Patent No.: US 8,850,332 B2
Horiuchi  (45) Date of Patent: Sep. 30, 2014

(54) OBJECT SELECTION IN WEB PAGE AUTHORING

(75) Inventor: Yoshio Horiuchi, Kanagawa-ken (JP)

(73) Assignee: International Business Machines Corporation, Armonk, NY (US)

(*) Notice: Subject to any disclaimer, the term of this patent is extended or adjusted under 35 U.S.C. 154(b) by 648 days.

(21) Appl. No.: 11/949,179

(22) Filed: Dec. 3, 2007

(65) Prior Publication Data

US 2008/0163102 A1 Jul. 3, 2008

(30) Foreign Application Priority Data

Dec. 28, 2006 (JP) .................................. 2006-355575

(51) Int. Cl.
*G06F 3/048* (2013.01)
*G06F 17/21* (2006.01)
*G06F 17/30* (2006.01)
*G09B 7/00* (2006.01)

(52) U.S. Cl.
CPC .... *G06F 17/212* (2013.01); *G06F 2203/04803* (2013.01); *G06F 17/30896* (2013.01); *G09B 7/00* (2013.01)
USPC ........... 715/759; 715/781; 715/253; 715/208; 715/235; 715/272

(58) Field of Classification Search
CPC .................... G06F 17/212; G06F 2203/04803; F06F 17/30896; G09B 7/00
USPC .................. 715/781, 759, 253, 208, 235, 272
See application file for complete search history.

(56) References Cited

U.S. PATENT DOCUMENTS

| 5,442,788 | A | * | 8/1995 | Bier ............................... 715/751 |
| 5,642,475 | A | * | 6/1997 | Itoh et al. ....................... 345/645 |
| 5,911,067 | A | * | 6/1999 | Owens et al. .................. 719/310 |
| 6,178,432 | B1 | * | 1/2001 | Cook et al. .................... 715/201 |

(Continued)

FOREIGN PATENT DOCUMENTS

| BR | PI0719484 A2 | 2/2014 |
| CA | 2666305 A1 | 7/2008 |

(Continued)

OTHER PUBLICATIONS

Xiao et al., "Browsing on Small Displays by Transforming Web Pages into Hierarchically Structured Subpages". Jan. 2009.*

(Continued)

*Primary Examiner* — Ece Hur
(74) *Attorney, Agent, or Firm* — Cuenot, Forsythe & Kim, LLC

(57) ABSTRACT

A method performed in a web page authoring system having a user input system and an editing screen display for displaying a representation of a tag associated with a display artifact represented on the editing screen display is disclosed. A user action input selecting a reference point on the editing screen display for a web page being authored is received. A reference area on the editing screen display enclosing the selected reference point is set. The display object closest to the reference point is selected as a reference display artifact from among display artifacts in the reference area. A tag associated with the reference display artifact is selected from among tags associated with the display artifacts. A first rectangle is drawn on the editing screen display artifact. A second, larger rectangle is drawn enclosing the first rectangle. A space between the first and second rectangles represents the selected tag.

18 Claims, 11 Drawing Sheets

(56) References Cited

U.S. PATENT DOCUMENTS

| | | | | |
|---|---|---|---|---|
| 6,278,991 | B1* | 8/2001 | Ebert | 1/1 |
| 7,673,230 | B2* | 3/2010 | Cote et al. | 715/234 |
| 7,945,653 | B2* | 5/2011 | Zuckerberg et al. | 709/223 |
| 8,078,979 | B2* | 12/2011 | Howard et al. | 715/760 |
| 2003/0196174 | A1 | 10/2003 | Pierre Cote et al. | |
| 2006/0041589 | A1* | 2/2006 | Helfman et al. | 707/104.1 |
| 2006/0048059 | A1* | 3/2006 | Etkin | 715/745 |
| 2006/0253491 | A1* | 11/2006 | Gokturk et al. | 707/104.1 |
| 2008/0307308 | A1* | 12/2008 | Sullivan et al. | 715/723 |
| 2011/0202531 | A1* | 8/2011 | Zuckerberg et al. | 707/737 |

FOREIGN PATENT DOCUMENTS

| | | | |
|---|---|---|---|
| CN | 101578576 A | * | 11/2009 |
| EP | 2116925 A1 | * | 11/2009 |
| JP | H04-111051 | | 4/1992 |
| JP | 10-222506 | | 8/1998 |
| JP | H10222503 A | | 8/1998 |
| JP | 2000-035961 | | 2/2000 |
| JP | 2000035961 A | | 2/2000 |
| JP | 2001-027924 | | 1/2001 |
| JP | 4959722 B2 | | 6/2012 |
| KR | 20090087451 A | | 8/2009 |
| WO | 2008081733 A1 | | 7/2008 |

OTHER PUBLICATIONS

"Page Designer" IBM WebSphere Studio, IBM Japan Systems Engineering Co. Ltd. 2002.

WIPO Appln. No. PCT/JP2007/074530, Int'l. Preliminary Report on Patentability, Jun. 30, 2009.

CA Appln. No. 2,666,305, Office Action, Feb. 21, 2014, 3 pg.

* cited by examiner

FIG. 2

```
1   <html>
2   <head>
3   <title>main</title>
4   </head>
5   <body>
6   <table border="0">
7      <tbody>
8         <tr>
9            <th>Menu</th>
10           <th>Contents</th>
11        </tr>
12        <tr>
13           <td>
14           <table border="0">
15              <tbody>
16                 <tr>
17                    <td>
18                    <table border="0">
19                       <tbody>
20                          <tr>
21                             <td>Sun</td>
22                          </tr>
23                          <tr>
24                             <td>Cloud</td>
25                          </tr>
26                          <tr>
27                             <td>Moon</td>
28                          </tr>
29                       </tbody>
30                    </table>
31                    </td>
32                 </tr>
33                 <tr>
34                    <td>Item 1</td>
35                 </tr>
36                 <tr>
37                    <td>Item 2</td>
38                 </tr>
39                 <tr>
40                    <td>Item 3</td>
41                 </tr>
42              </tbody>
43           </table>
44           </td>
45           <td>
46           <table border="0">
47              <tbody>
48                 <tr>
49                    <td><img border="0" src="sun.gif" width="64" height="64"></td>
50                    <td><img border="0" src="cloud.gif" width="64" height="64"></td>
51                 </tr>
52                 <tr>
53                    <td><img border="0" src="moon.gif" width="64" height="64"></td>
54                 </tr>
55              </tbody>
56           </table>
57           </td>
58        </tr>
59     </tbody>
60  </table>
61  </body>
62  </html>
```

OBJECT SELECTION IN WEB PAGE AUTHORING

BACKGROUND OF THE INVENTION

The present invention relates to web page authoring. In particular, the present invention relates to object (tag) selection in web page authoring.

Web pages are written in tag-based markup languages (HTML, XML, JSP, etc.). In web page editing, editing operations such as insertion and deletion of tags and setting of tag properties are basically performed by selecting a tag to be edited. Many tools provide editing screens in which display artifacts (that is, text or images) defined by tags are visualized as those artifacts would appear on a browser screen. Such editing screens, often referred to as WYSIWYG editing screens, can make it easier for a web programmer to be certain the user's browser will display exactly what the programmer wants it to display.

However, one drawback of WYSIWYG editing is that numerous non-visible tags are typically associated with a single display artifact. When a significant number of display artifacts appear on the screen at the same time, it can be difficult to select a particular tag to be edited.

For example, even for the simple editing screen illustrated in FIG. 1, a corresponding HTML source file has a nested multi-tag structure illustrated in FIG. 2. Simply selecting a display artifact that appears on the editing screen may not make it possible to select a particular tag related to that artifact in the HTML source file. To address this, a conventional web page authoring tool can have a special user interface (UI) in which HTML tags are displayed in a hierarchical manner. However, this UI has a normal tree structure that does not reflect the layout of a WYSIWYG editing screen.

If the source code illustrated in FIG. 2 is directly displayed, individual tags may be easily selected. However, the source code listing does not make it easy to visualize the screen that will actually be rendered when the source code is executed. Thus, it may be difficult to recognize where an area corresponding to a particular tag in the source code listing is located on an actual web page by simply viewing the source code listing.

According to one known technique, icons corresponding to open/close of a tag are displayed on an editing screen with a view to increasing convenience in tag selection. However, this technique reduces the WYSIWYG effect for the entire page.

In general, tag selection has conventionally been performed at the expense of the WYSIWYG effect for a web page editing screen.

BRIEF SUMMARY OF THE INVENTION

The present invention may be implemented as a computer-implemented method for supporting tag selection in webpage authoring. A user action input selecting a reference point on an editing screen is received. A reference area enclosing the selected reference point is set and a view object closest to the reference point is selected as a reference view object from among view object included in the reference area. A view object related to the reference view object is selected from other view objects included in the reference area. A first rectangle representing the reference view object is drawn. A second rectangle representing the related view object is drawn with a space between the first second rectangles to facilitate selection of an object by selection of the rectangle.

The present invention may also be implemented as a computer program product for supporting tag selection in webpage authoring. The computer program product includes a computer usable storage medium embodying computer usable program code. The computer usable program code includes code configured to receive a user action input selecting a reference point on an editing screen for a webpage, code configured to set a reference area enclosing the selected reference point, code configured to select a view object closest to the reference point as a reference view object, code configured to select a view object related to the reference view object from among other view objects included in the reference area, and code configured to draw a first rectangle representing the reference view object and a second rectangle representing the related view object with a space between the rectangles to facilitate selection of the reference view object or the related view object by selection of the appropriate rectangle.

Finally, the present invention may be implemented as an apparatus for supporting object selection in webpage authoring. The apparatus includes a reference point determining unit for determining a reference point on an editing screen in response to a user action in a reference area setting unit for sending a reference area enclosing the reference point. The apparatus further includes a related view object selecting unit for selecting a view object related to the reference view object and a drawing unit for driving a first rectangle representing the reference view object in the second rectangle representing the related view object. A space is provided between the two rectangles to facilitate selection of one of the rectangles representing the reference view object or the related view object.

BRIEF DESCRIPTION OF THE SEVERAL VIEWS OF THE DRAWINGS

FIG. 2 is an HTML source file for the web page illustrated in FIG. 1.

DETAILED DESCRIPTION OF THE INVENTION

Figure 1:
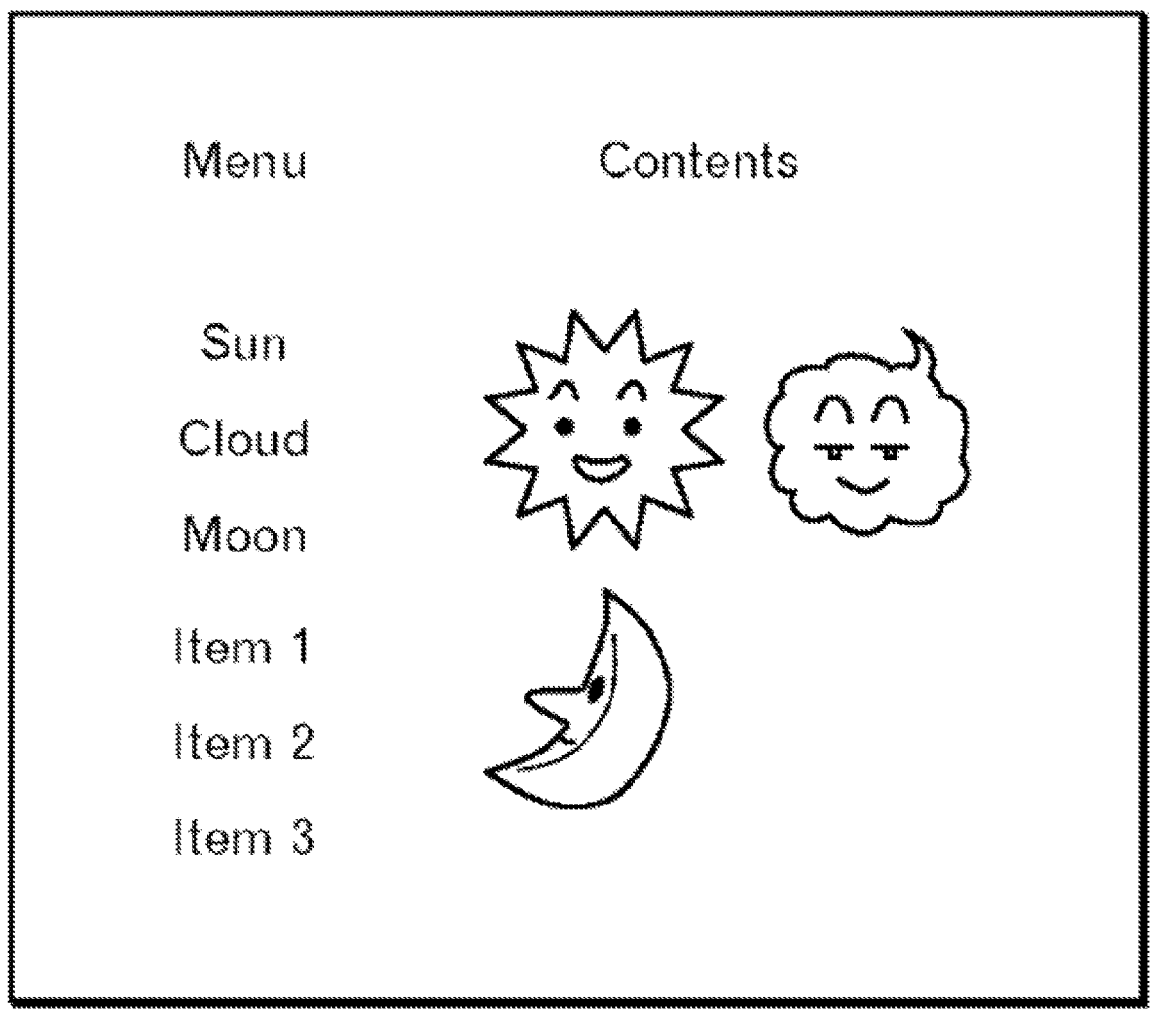
FIG. 1 is an example of a web page.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 3:
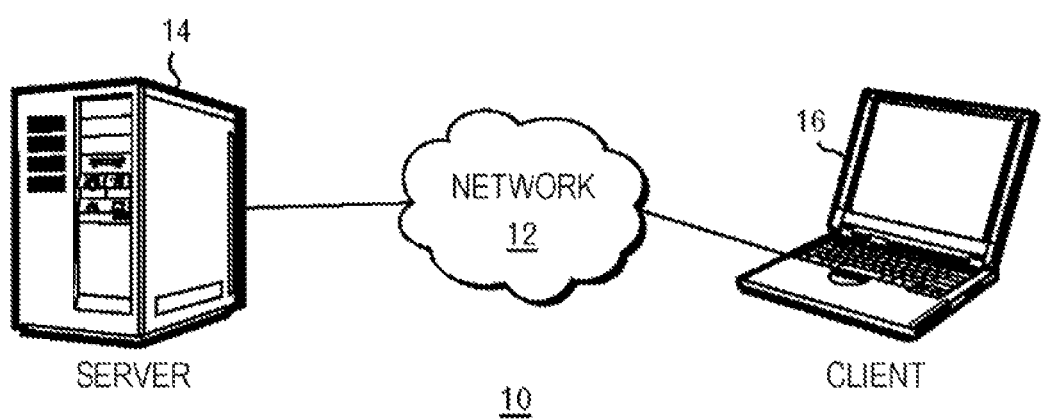
FIG. 3 is an example of an environment for implementing the present invention.

FIG. 3 illustrates an example of an environment for implementing the present invention. A system 10 includes a server 14 and a client 16 which are connected to a network 12. In the system 10, a web page stored in the server 14 can be edited in the client 16. The network 12 may be any network such as the Internet, a local area network (LAN), or a wide area network (WAN). It is also possible to connect a plurality of clients to the network so that the clients cooperatively edit a web page. Such an editing scheme is called web collaboration or simply collaboration and is employed in various fields, including web page authoring. Needless to say, the present invention can be implemented not only in the network environment illustrated in FIG. 3, but also in a stand alone client in which the web page to be edited is stored.

Figure 4:
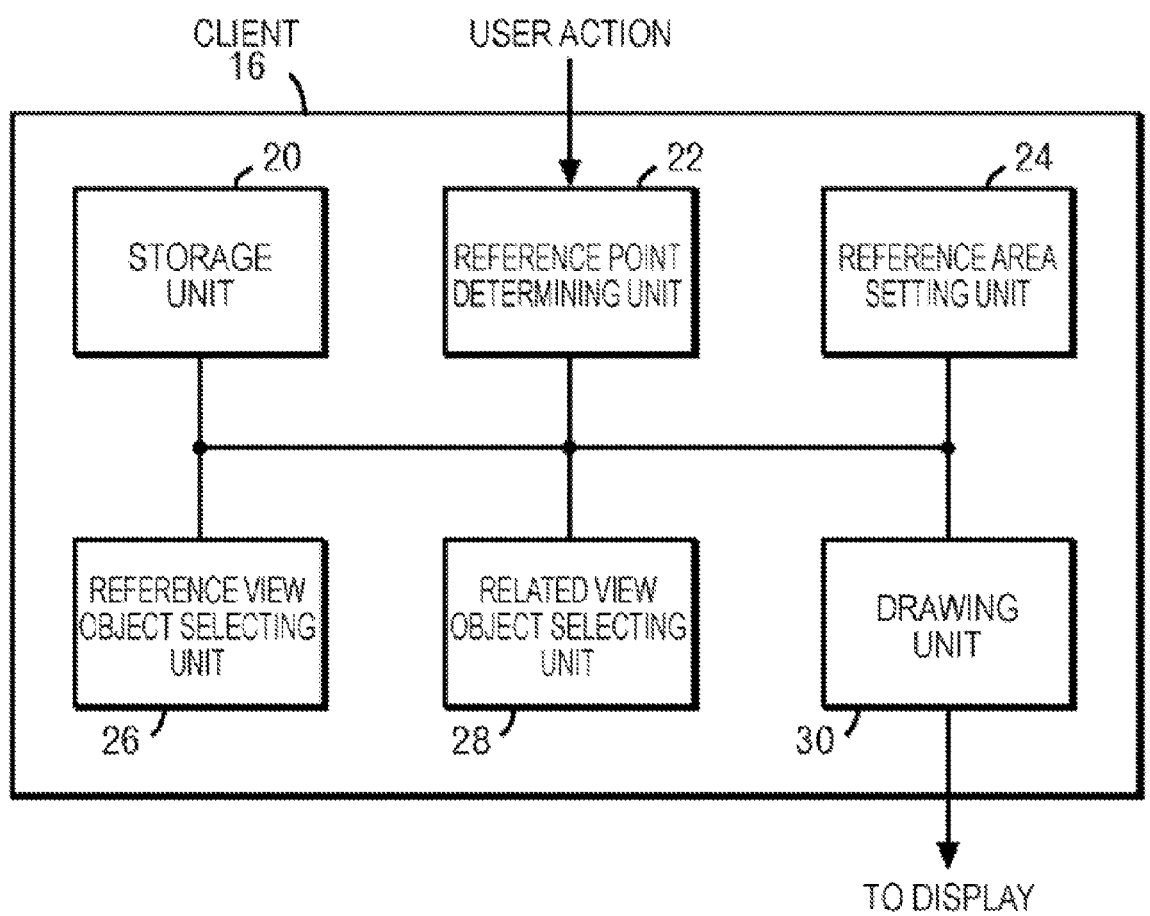
FIG. 4 is a block diagram illustrating a functional configuration of a client according to the present invention.

FIG. 4 illustrates an example of a functional configuration of the client 16 that performs authoring of a web page according to the present invention. The client 16 has a storage unit 20, a reference point determining unit 22, a reference area setting unit 24, a reference view object selecting unit 26, a related view object selecting unit 28, and a drawing unit 30.

The storage unit 20 stores data defining a web page (for example, an HTML source file) received from the server 14 through the network 12. The reference point determining unit 22 determines a reference point for object selection in response to a user action performed on an editing screen for a web page. Ordinarily, the reference point will coincide with a display artifact appearing on the editing screen and selected by the user. The reference area setting unit 24 sets a reference area which encloses the reference point. The reference view object selecting unit 26 selects a view object (or display artifact) closest to the reference point as a reference view object from among a plurality of view objects (display artifact). The related view object selecting unit 28 selects a view object (tag) which is related to the reference view object from among the tags that are considered to be included in the reference area. The drawing unit 30 draws a first rectangle representing the reference view object (display artifact) and a second rectangle representing the related view object (tag) with a space therebetween which allows selection of the related view object or tag. The drawing unit 30 outputs a drawing result to a display (not shown) of the client 16.

Figure 5:
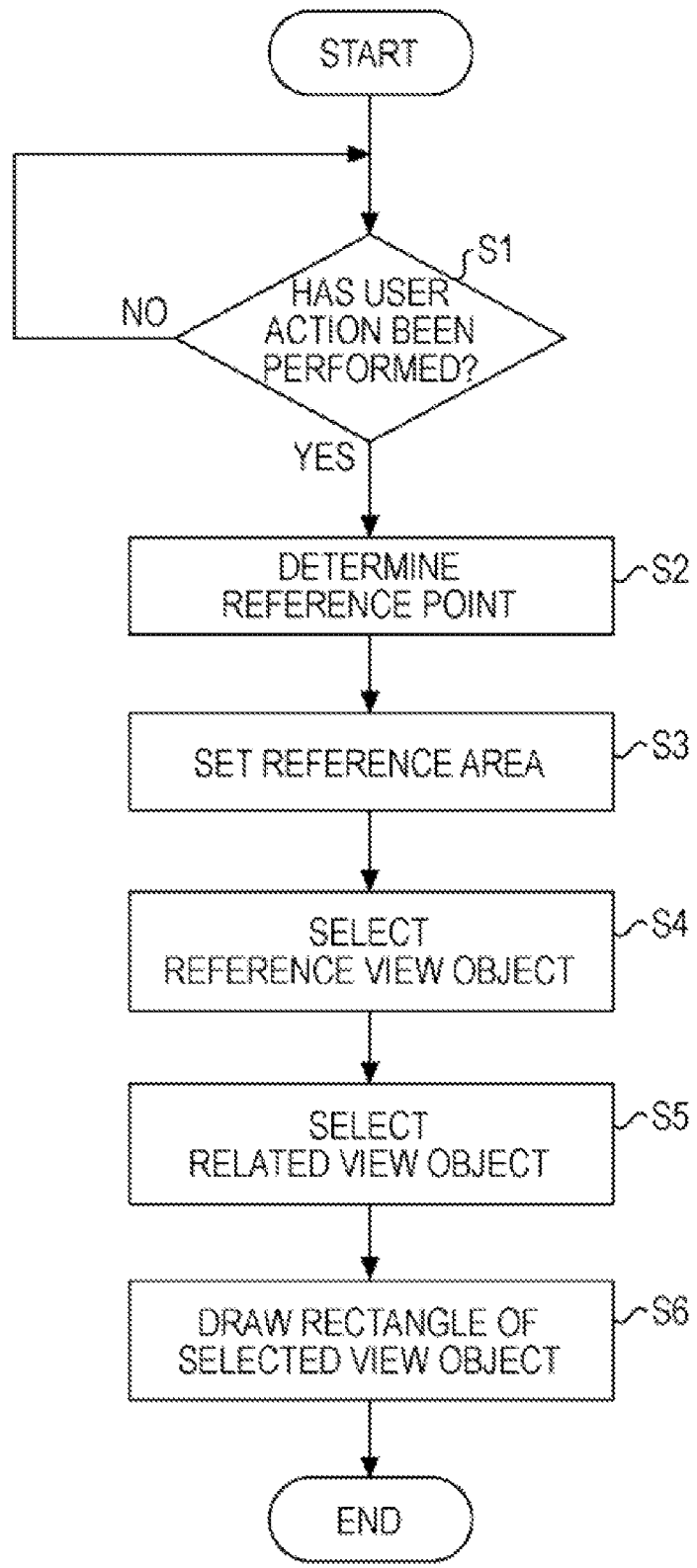
FIG. 5 is a flowchart illustrating operations of a client according to present invention.

A tag selection operation will be described in detail with reference to FIG. 5. It is assumed that the web page illustrated in FIG. 1 appears on the display of the client 16 as a WYSIWYG editing screen, and the source code listing illustrated in FIG. 2 is stored in the storage unit 20 of the client 16. The line numbers 1 to 62 in the illustrated source code listing are provided for ease of description but would not be included in the actual source code listing.

Before proceeding to a detailed description of the tag selection operation, a graphical tag structure of the web page shown in FIG. 1 will be briefly described with reference to FIG. 6. In HTML programming, an HTML table model can be used to arrange data (text, preformatted text, images, links, forms, form fields, other tables, etc.) into rows and columns of cells. Table cells may either contain header information or data. Table models allow authors to label cells so that user agents may more easily communicate heading information about the cells to the user. These mechanisms can assist users with visual disabilities and also make it possible for wireless browsers with limited display capabilities (for example, Web-enabled pagers and telephones) to handle tables. The following description reflects the fact the source code listing follows a table model.

Figure 6:
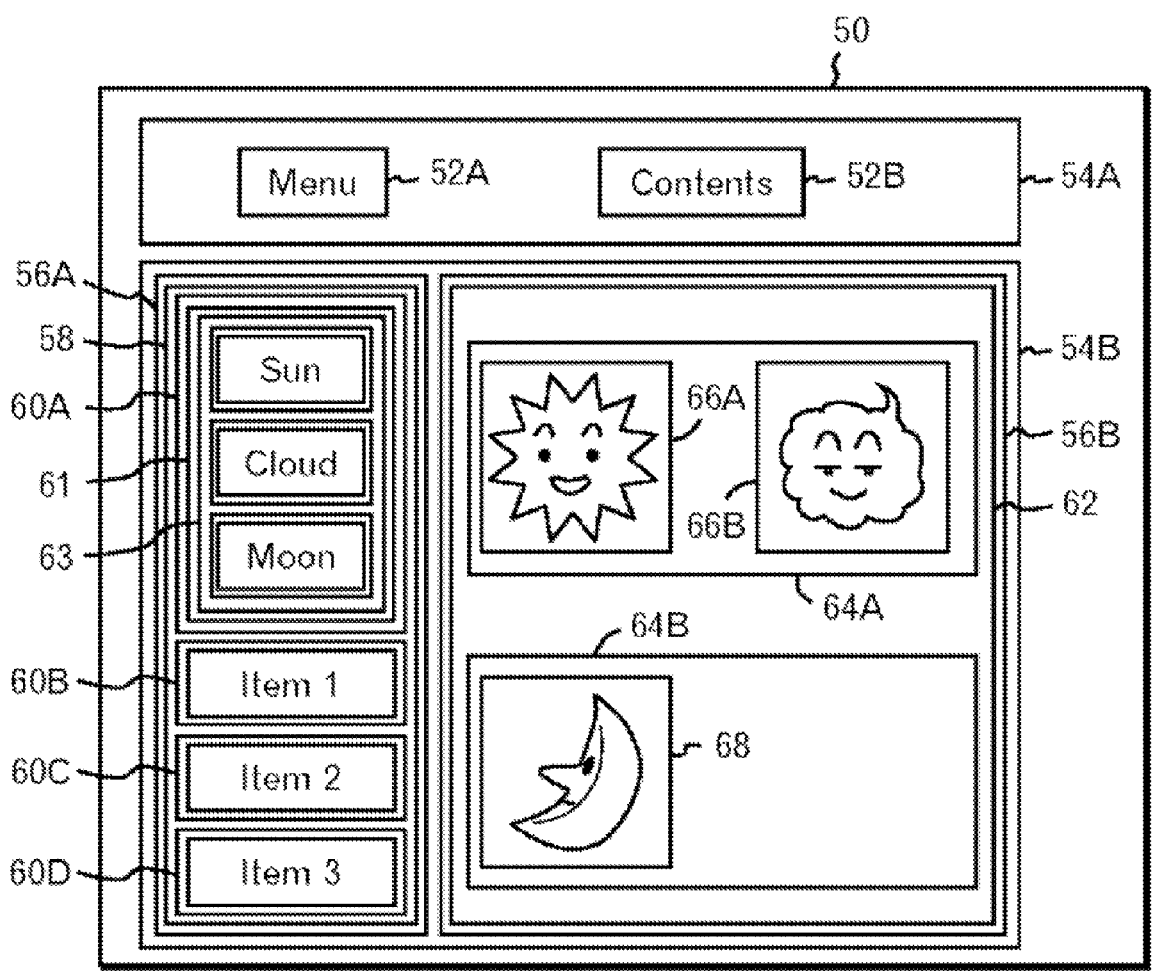
FIG. 6 is a diagram illustrating the web page shown in FIG. 1 together with a graphical tag structure.

In FIG. 6, each field between an open tag and a corresponding close tag in the source code in FIG. 2 is indicated by a rectangle. A table 50 that represents the web page includes a first row 54A having a header 52A "Menu" and a header 52B "Contents" (defined by lines 8 to 11 of the source code) and a second row 54B (defined by lines 12 to 58 of the source code). The row 54B has a first data cell 56A containing six character strings (defined by lines 13 to 44 of the source code) and a second data cell (table) 56B containing three images (defined by lines 45 to 57 of the source code). The table 50 also has a "tbody" field, but the "tbody" field is omitted in this example. All "tbody" fields in other tables are similarly omitted.

The first data cell 56A has a table 58 defined by lines 14 to 43 of the source code. The table 58 contains four rows 60A (defined by lines 16 to 32 of the source code), 60B (defined by lines 33 to 35 of the source code), 60C (defined by lines 36 to 38 of the source code), and 60D (defined by lines 39 to 41 of the source code). The row 60A contains a data cell 61 (defined by lines 17 to 31 of the source code) and a table 63 (defined by lines 18 to 30 of the source code). The table 63 contains three rows containing data cells "Sun", "Cloud", and "Moon", respectively. The row 60B contains a data cell "Item1" (defined by line 34 of the source code). The row 60C contains a data cell "Item2" (defined by line 37 of the source code). The row 60D contains a data cell "Item3" (defined by line 40 of the source code).

The second data cell 56B has a table 62 (defined by lines 46 to 56 of the source code). The table 62 contains two rows 64A (defined by lines 48 to 51 of the source code) and 64B (defined by lines 52 to 54 of the source code). The row 64A includes a data cell 66A containing an image of "Sun" (defined by line 49 of the source code) and a data cell 66B containing an image of "Cloud" (defined by line 50 of the source code). The row 64B includes a data cell 68 containing an image of "Moon" (defined by line 53 of the source code).

Referring back to FIG. 5, at STEP S1, the client 16 checks whether a user action for selecting an object (tag) has been performed on the editing screen in FIG. 1. This user action is predefined. For example, pressing a Ctrl key while clicking a right button of a mouse can be defined as a trigger for selecting an object at a cursor location. Needless to say, alternative mouse/key combinations can be defined as the trigger for object selection.

If an object-selecting operation has been performed, the reference point determining unit 22 determines a reference point for the object selection at STEP S2. For example, the reference point determining unit 22 can read a position of a pointer as the reference point. The pointer will typically be visible, such as a cursor, but may be established by a technology such as a touch screen technology, that may not employ a visible pointer. When the reference point is determined, the reference area setting unit 24 sets a reference area that encloses the reference point at STEP S3. This reference area is set to a predetermined size that allows selection of several objects which are logically in the vicinity of the reference point even though the objects may not appear visually on the screen.

Figure 7:
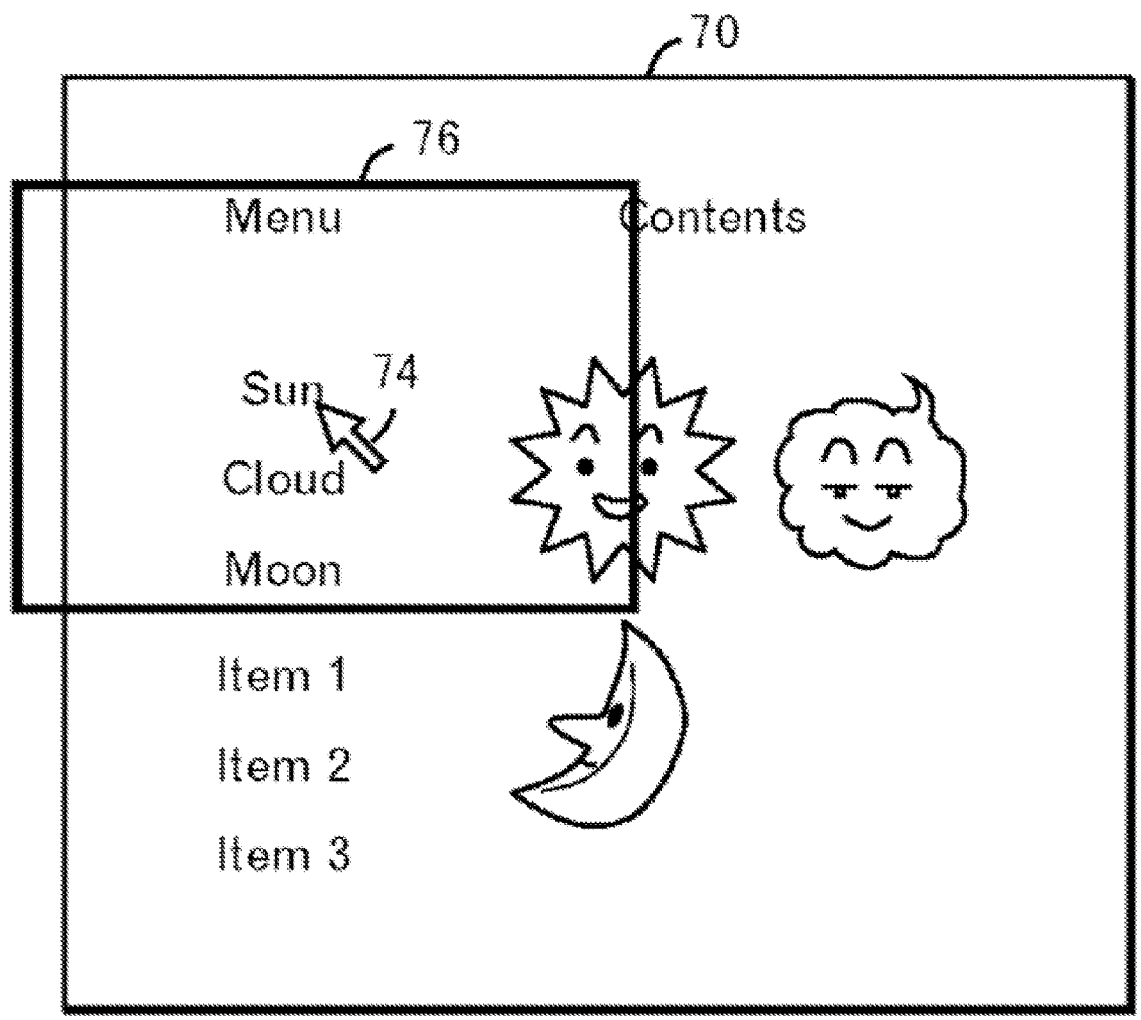
FIG. 7 illustrates a reference area established in the web page illustrated in FIG. 1.

For example, the height and width of the reference area may be established as one third of the height and width of the editing screen as illustrated in FIG. 7. When a user selects a reference point position as illustrated by cursor 74, a reference area 76 surrounding the reference point is established. While FIG. 7 shows a rectangular reference area 76, shapes other than rectangles can be used in defining reference areas.

Referring back to FIG. 5, once the reference area is established, the reference view object selecting unit 26 selects, at STEP S4, an object (display artifact) that is closest to the reference point from among the display artifacts falling within the reference area. Such an object closest to the reference point may be an object that includes the reference point, an object whose perimeter is adjacent to the reference point, etc., and is selected on the basis of the tree structure as shown in FIG. 2. Explaining with reference to the examples of FIG. 6 and FIG. 7, since the reference point indicated by the position of the cursor 74 is associated with data cell 58A containing the character string "Sun", the reference view object selecting unit 26 may select the data cell 58A as a reference view object associated with Bill displayed character string "Sun".

When the reference view object is selected, the related view object selecting unit 28 selects, at STEP S5, a view object that is related to the selected reference view object selected by the reference view object selecting unit 26 from among the view objects included in the form of a reference area. This related view object is at least one of a sibling object, a parent object, and a child object of the reference view object. In this context, the term "object" refers primarily to tags in the source code. In the following, the selection of the related view object will be described with reference to a tree structure shown in FIG. 8.

Figure 8:
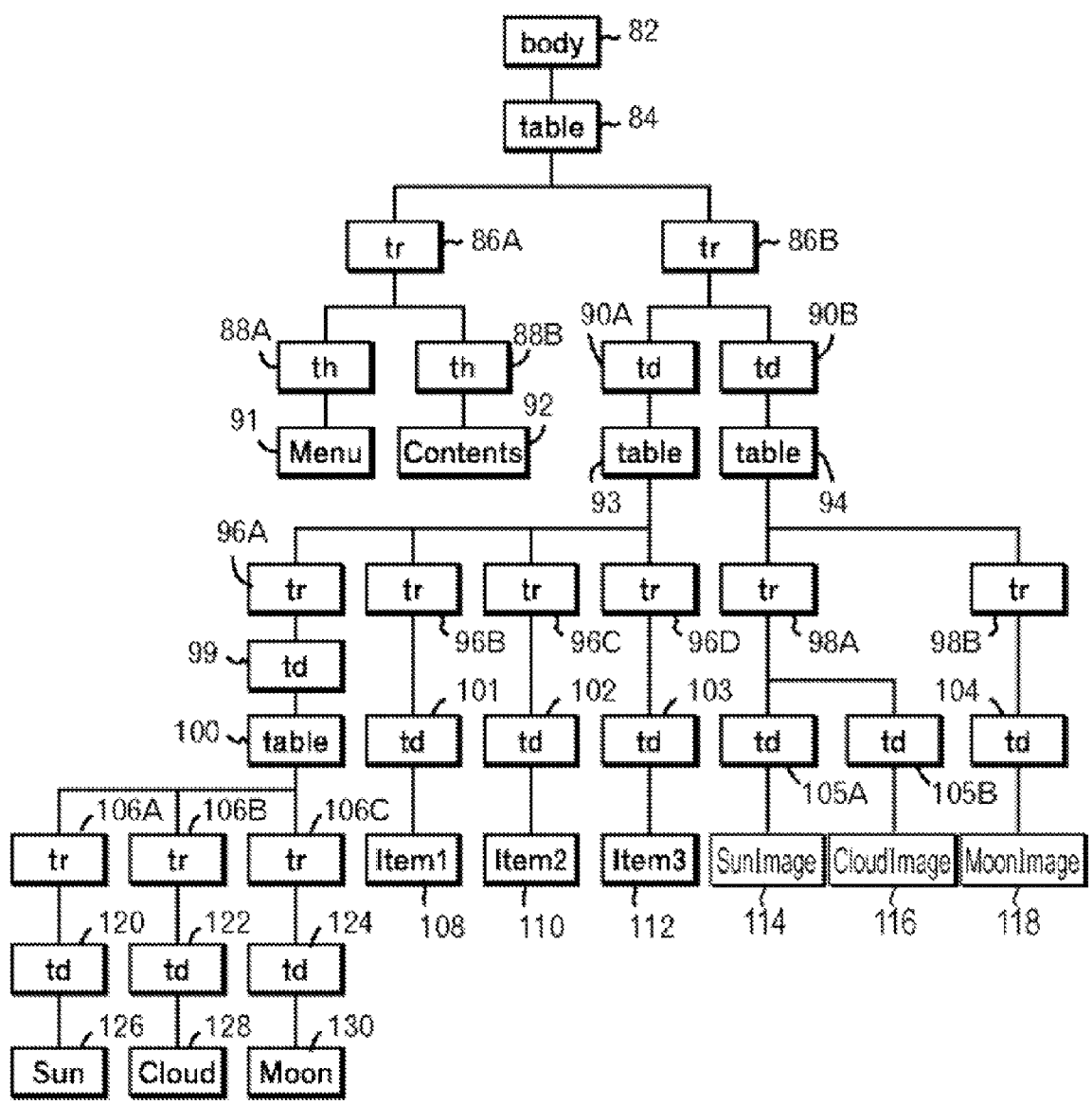
FIG. 8 is a tree diagram of a the HTML source file illustrated in FIG. 2.

FIG. 8 shows the source code of FIG. 2 in the form of a tree. The storage unit 20 also stores this tree structure. Correspondence relationships between individual nodes of the tree and the line numbers of the source code are as follows.

| | |
|---|---|
| body 82 (root node): | lines 5-61 |
| table 84: | lines 6-60 |
| tr 86A: | lines 8-11 |
| tr 86B: | lines 12-58 |
| th 88A: | line 9 |
| th 88B: | line 10 |
| td 90A: | lines 13-44 |
| td 90B: | lines 45-57 |
| Menu 91: | line 9 |
| Contents 92: | line 10 |
| table 93: | lines 14-43 |
| table 94: | lines 46-56 |
| tr 96A: | lines 16-32 |
| tr 96B: | lines 33-35 |
| tr 96C: | lines 36-38 |
| tr 96D: | lines 39-41 |
| tr 98A: | lines 48-51 |
| tr 98B: | lines 52-54 |
| td 99: | lines 17-31 |
| td 101: | line 34 |
| td 102: | line 37 |
| td 103: | line 40 |
| td 105A: | line 49 |

| | |
|---|---|
| td 105B: | line 50 |
| td 104: | line 53 |
| table 100: | lines 18-30 |
| Item1 108: | line 34 |
| Item2 110: | line 37 |
| Item3 112: | line 40 |
| Sun image 114: | line 49 |
| Cloud image 116: | line 50 |
| Moon image 118: | line 53 |
| tr 106A: | lines 20-22 |
| tr 106B: | lines 23-25 |
| tr 106C: | lines 26-28 |
| td 120: | line 21 |
| td 122: | line 24 |
| td 124: | line 27 |
| Sun 126: | line 21 |
| Cloud 128: | line 24 |
| Moon 130: | line 27 |

The related view object selecting unit 28 searches the tree structure of the source code stored in the storage unit 20 for a sibling object, a parent object, and a child object of the reference view object in that order from among a plurality of view objects included in the reference area. When a parent object or a child object is found, the related view object selecting unit 28 then searches for a sibling object, a parent object, and a child object of the found parent or child object in that order. The related view object selecting unit 28 repeats the same search order a until no object is found.

Specifically, in the examples of FIG. 6 and FIG. 7, since the data cell 58A containing the character string "Sun" has been selected as the reference view object, the related view object selecting unit 28 first searches for a sibling object of the data cell 58A from among the objects included in the reference area 76 shown in FIG. 7. In the tree structure shown in FIG. 8, the data cell 58A corresponds to the node 120. However, since the node 120 does not have a sibling node, the related view object selecting unit 28 then searches for a parent node and a child node of the node 120. The node 120 has a parent node 106A and a child node 126. Since both the node 106A and the node 126 are included in the reference area 76, the related view object selecting unit 28 selects these nodes as related view objects.

Subsequently, the related view object selecting unit 28 searches for a sibling node of the parent node 106A. In the example of FIG. 8, the node 106A has sibling nodes 106B and 106C. Since both the sibling nodes 106B and 106C are included in the reference area 76, the related view object selecting unit 28 selects these nodes as related view objects. Further, the related view object selecting unit 28 searches for a parent node of the nodes 106A, 106B, and 106C, and child nodes of the nodes 106B and 106C and thus selects the nodes 100, 122, 124, 128, and 130. Likewise, the related view object selecting unit 28 continues to search for a sibling node, a parent node, and a child node until no related view object included in the reference area is found. According to the present invention, searches for a sibling node, a parent node, and a child node can be performed in any order, and it is not necessary to perform a search for a sibling node first.

When the above search sequence is completed, the related view object selecting unit 28 stores the selected objects in the storage unit 20 in the form of a tree structure such as the one shown in FIG. 8. Further, the related view object selecting unit 28 provides the drawing unit 30 with a pointer for specifying the reference view object.

When the selection of related view objects is completed, the drawing unit 30 draws, at STEP S6, a first rectangle representing the reference view object and a second rectangle representing a related view object with a space between the rectangles which allows object selection. At this time, the drawing unit 30 draws the first rectangle and the second rectangle independently of the screen location of the reference view object and the related view object, in a pop-up UI, for example. Alternatively, it may be possible to temporarily rewrite associated parts in the WYSIWYG editing screen.

Figure 9:
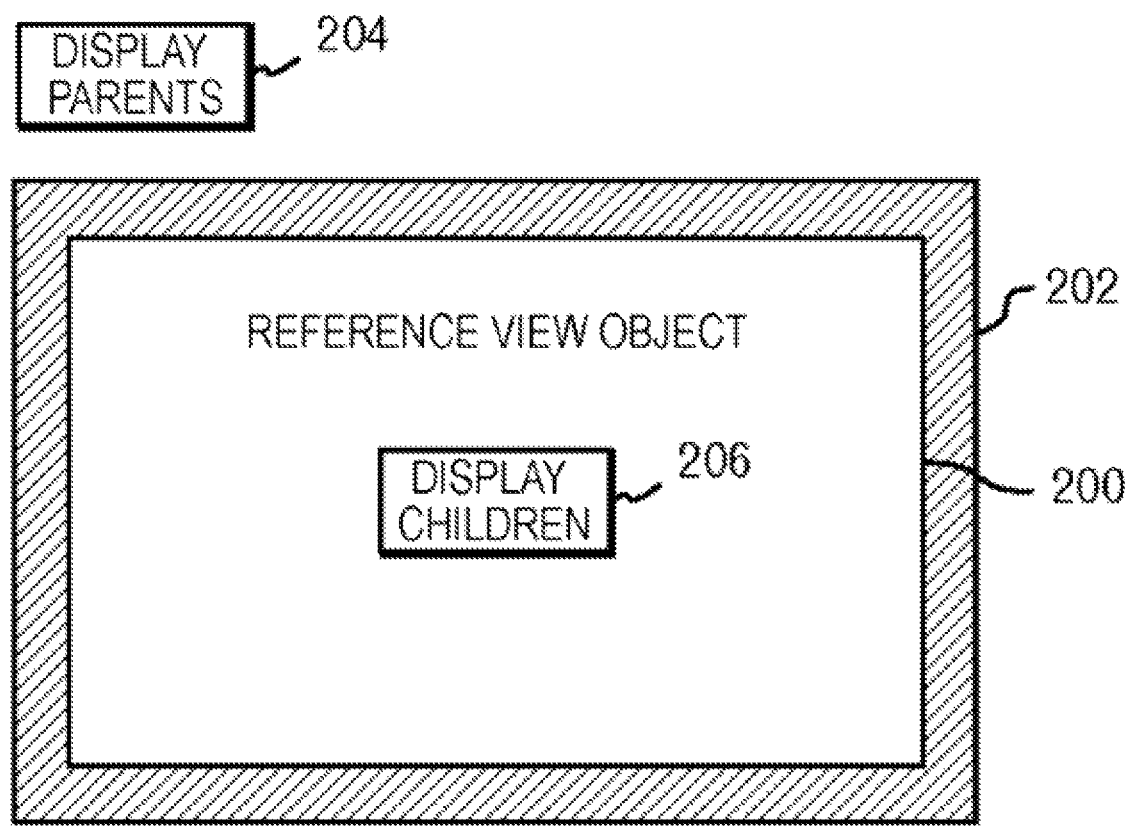
FIG. 9 illustrates a basic concept for drawing selected objects and related icons by a drawing unit of a client according to present invention.

An example of the drawing operation is illustrated in FIG. 9. The drawing unit 30 first draws a first rectangle 200 representing the reference view object specified by the pointer by using a layout result of the original reference view object. The size of the rectangle 200 can be determined by taking into account the size of a web page editing screen and the positions of the reference view object and the related view object. If, for example, a character string "AAAAAAABBBBBBBBC-CCC" is separated into "AAAAAAABBBBB" and "BBBC-CCC" due to wrapping of the character string, two rectangles can be provided. A combination of such rectangles is also applied to the present invention.

For a related view object which is a parent object, the drawing unit 30 draws a second rectangle 202 representing the related view object with a space that allows object selection (indicated by shading in FIG. 9) between the rectangles 200 and 202. A user can temporarily select the related view object, i.e., a desired tag, by clicking, for example, the perimeter of the rectangle 202. Thus, it is preferable to draw the perimeter having a thickness sufficient for the selecting operation. The width of the space can arbitrarily be set. For example, the width can be determined on the basis of the height of a default font of a web page. If the number of parent nodes obtained by tracing up the tree structure created by the related view object selecting unit 28 is very large, resulting in an excessive size of a pop-up UI to be drawn, drawing of the parent objects can be discontinued. Instead, an icon 204 indicating that there are more parent objects can be displayed in the upper left portion of the screen.

For a child object, the drawing unit 30 draws the second rectangle inside the rectangle 200 of the reference view object. Also in this case, a predetermined space is provided between the first and second rectangles. If the number of child objects (descendants) obtained by tracing down the tree structure created by the related view object selecting unit 28 is too large to draw all rectangles corresponding to the child objects inside the rectangle 200, an icon 206 indicating that there are more child objects can be provided inside the rectangle 200, for example. When the user clicks the icon 204 or the icon 206, the drawing unit 30 re-draws the entire rectangles including the omitted parent object or child object as a new reference view object. When there is room inside the rectangle 200, the drawing unit 30 may draw a corresponding character or image inside a child object drawn last. In addition, there may be a case where the reference view object has a plurality of child objects that are siblings and each of the child objects has many descendants and thus all of the descendant objects cannot be drawn inside the rectangle 200. In such a case, the icon 206 is displayed inside a rectangle corresponding to each child object.

For a sibling object, the above arrangement is not necessary, since a sibling object does not overlap a reference view object. However, a space between rectangles corresponding to the reference view object and the sibling object may be determined as described above.

Figure 10:
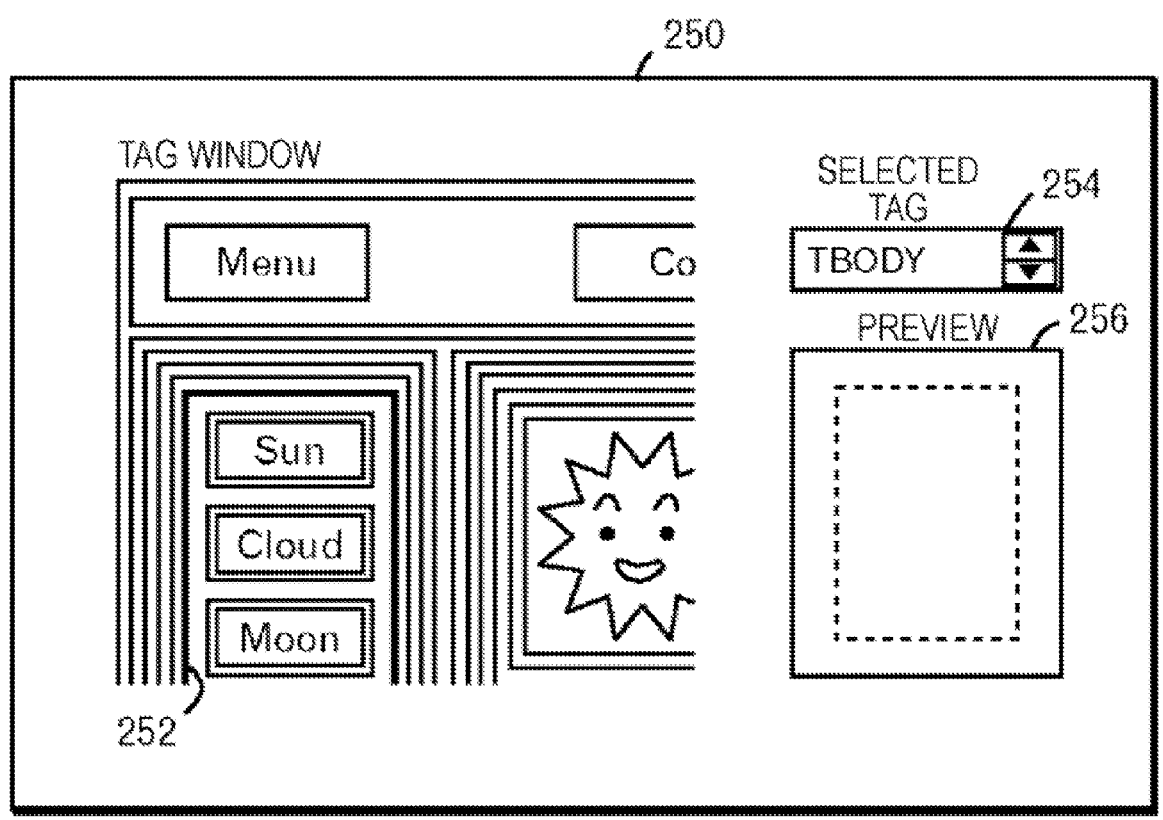
FIG. 10 is a diagram illustrating an example of an actual drawing result obtained by a drawing unit of a client according to the present invention.

FIG. 10 illustrates a pop-up UI which is eventually rendered by the drawing operation performed by the drawing unit 30. A pop-up UI 250 can be displayed separately from a window of the editing screen illustrated in FIG. 1 or can be superimposed on the window but not overlapping the reference area. The pop-up UI 250 contains a tag window, in which the rectangles corresponding to the reference view object and the related view objects are drawn, and fields 254 and 256 each indicating a status of a selected tag. The field 254 contains the name of a tag which is currently temporarily selected by a user. The field 256 is a preview area indicating the temporarily selected tag. In the example of FIG. 10, a selected tag may be temporarily indicated by a thick line 252. The user can select a specific tag displayed in the tag window by clicking the day already displayed in the tag window or by scrolling upward or downward using scroll controls provided at the right end of the field 254. When a desired tag is located, a user can enable the selection of the day by, for example, pressing an Enter key. In this case, an area corresponding to the selected tag can be highlighted in a predetermined manner in the editing screen in FIG. 1, so that the user can easily recognize which part of the actual screen is selected.

Figure 11:
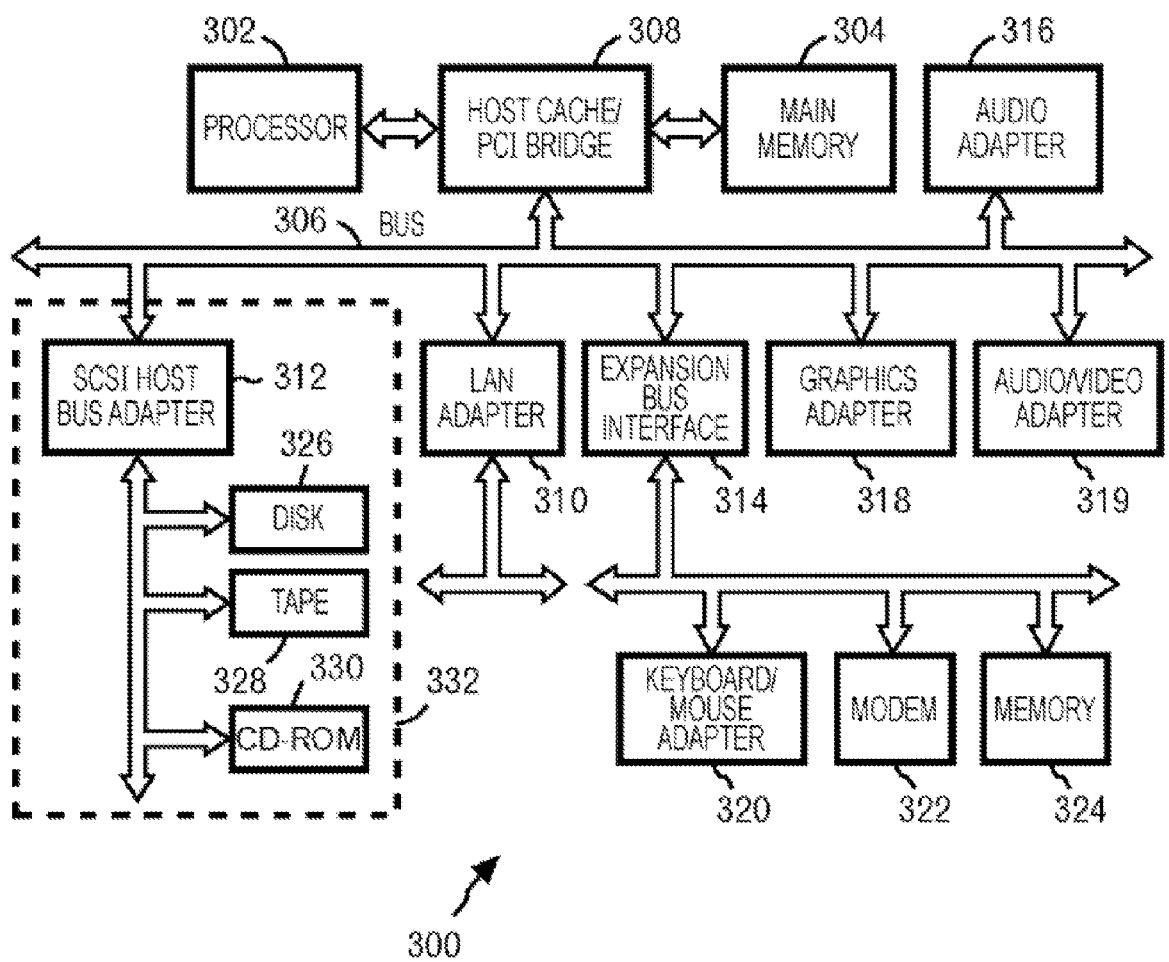
FIG. 11 is a block diagram illustrating an example of a data processing system that can be implemented as a client according to the present invention.

FIG. 11 illustrates an example of a data processing system that can be implemented as the client 16. A data processing system 300 employs a PCI local bus architecture. In this example, although the data processing system 300 employs a PCI bus, other bus architectures such as AGP and ISA may be used. A processor 302 and a main memory 304 are connected to a PCI local bus 306 through a PCI bridge 308. The PCI bridge 308 may include an integrated memory controller and a cache memory for the processor 302. Additional connections to the PCI local bus 306 may be made through direct component interconnection or through add-in boards. In the example of FIG. 11, a LAN adapter 310, an SCSI host bus adapter 312, and an expansion bus interface 314 are connected to the PCI local bus 306 by direct component connection. In contrast, an audio adapter 316, a graphics adapter 318, and an audio/video adapter 319 are connected to the PCI local bus 306 by add-in boards inserted into expansion slots. The expansion bus interface 314 provides connection for a keyboard and mouse adapter 320, a modem 322, and an additional memory 324. The SCSI host bus adapter 312 provides connection for a hard disk drive 326, a tape drive 328, and a CD-ROM drive 330. Typical PCI local bus implementations will support three or four PCI expansion slots or add-in connectors.

An operating system runs on the processor 302 to control various components of the data processing system 300 in FIG. 3. The operating system may be a commercially available operating system such as Windows® XP, which is available from Microsoft Corporation. A program according to the present invention runs under the operating system to realize the various functions described above. The operating system and the program according to the present invention are stored in a storage device such as the hard disk drive 326 and loaded to the main memory 304 when executed by the processor 302.

Those of ordinary skill in the art will appreciate that the hardware in FIG. 11 may vary depending on the implementation. Other internal hardware or peripheral devices, such as a flash ROM (or an equivalent non-volatile memory) and an optical disk drive may be used in addition to or in place of the hardware illustrated in FIG. 11.

While the embodiments of the present invention have been described above with reference to the drawings, the described embodiments are merely illustrative and are not intended to limit the scope of the present invention as defined in the appended claims. Those of ordinary skill in the art will readily appreciate that various modifications and changes may be applied to the above described embodiments without departing from the spirit of the present invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer-implemented method performed in a web page authoring system having a user input system and an editing screen display for displaying a representation of a tag associated with a display artifact represented on the editing screen display, said method comprising: receiving a user action input selecting a reference point on the editing screen display for a web page being authored; setting a reference area on the editing screen display enclosing the selected reference point; selecting the display artifact closest to the reference point as a reference display artifact from among display artifacts in the reference area; selecting a tag associated with the reference display artifact from among tags associated with the display artifacts in the reference area; and drawing a first rectangle on the editing screen display enclosing the selected display artifact and a second, larger rectangle enclosing said first rectangle, a space between said first and second rectangles representing the selected tag, wherein the selected tag, associated with the first rectangle and the selected display artifact, includes an open tag and a corresponding close tag.

2. The method of claim 1, wherein
the receiving the user action input includes reading the location of a pointer on the editing screen display.

3. The method of claim 1, wherein
the reference area is a predetermined size centered on the selected reference point.

4. The method of claim 1, wherein
the selected tag related to the reference display is artifact at least one of a sibling tag, a parent tag, and a child tag.

5. The method of claim 1, further comprising
storing web page data in a tree.

6. The method of claim 5, wherein
the selecting the tag related to the reference display artifact includes searching the tree.

7. A computer hardware system, comprising: a web page authoring system having a user input system and an editing screen display for displaying a representation of a tag associated with a display artifact represented on the editing screen display, wherein, the web page authoring system is configured to perform: receiving a user action input selecting a reference point on the editing screen display for a web page being authored; setting a reference area on the editing screen display enclosing the selected reference point; selecting the display object closest to the reference point as a reference display artifact from among display artifacts in the reference area; selecting a tag associated with the reference display artifact from among tags associated with the display artifacts in the reference area; and drawing a first rectangle on the editing screen display artifact and a second, larger rectangle enclosing said first rectangle, a space between said first and second rectangles representing the selected tag, wherein the selected tag, associated with the first rectangle and the selected display object, includes an open tag and a corresponding close tag.

8. The system of claim 7, wherein
the receiving the user action input includes reading the location of a pointer on the editing screen display.

9. The system of claim 7, wherein
the reference area is a predetermined size centered on the selected reference point.

10. The system of claim 7, wherein
the selected tag related to the reference display is at least one of a sibling tag, a parent tag, and a child tag.

11. The system of claim 7, wherein
storing web page data in a tree.

12. The system of claim 11, wherein
the selecting the tag related to the reference display artifact includes searching the tree.

13. A computer program product, comprising: a computer usable storage medium having stored therein computer usable program code, the computer usable program code, when executed in a web page authoring system having a user input system and an editing screen display for displaying a representation of a tag associated with a display artifact represented on the editing screen display, causes the web page authorizing system to perform: receiving a user action input selecting a reference point on the editing screen display for a web page being authored; setting a reference area on the editing screen display enclosing the selected reference point; selecting the display object closest to the reference point as a reference display artifact from among display artifacts in the reference area; selecting a tag associated with the reference display artifact from among tags associated with the display artifacts in the reference area; and drawing a first rectangle on the editing screen display artifact and a second, larger rectangle enclosing said first rectangle, a space between said first and second rectangles representing the selected tag, wherein the selected tag, associated with the first rectangle and the selected display artifact, includes an open tag and a corresponding close tag.

14. The computer program product of claim 13, wherein
the receiving the user action input includes reading the location of a pointer on the editing screen display.

15. The computer program product of claim 13, wherein
the reference area is a predetermined size centered on the selected reference point.

16. The computer program product of claim 13, wherein
the selected tag related to the reference display is at least one of a sibling tag, a parent tag, and a child tag.

17. The computer program product of claim 13, wherein
storing web page data in a tree.

18. The computer program product of claim 17, wherein
the selecting the tag related to the reference display artifact includes searching the tree.

* * * * *